United States Patent
Papple et al.

(10) Patent No.: US 9,222,364 B2
(45) Date of Patent: Dec. 29, 2015

(54) PLATFORM COOLING CIRCUIT FOR A GAS TURBINE ENGINE COMPONENT

(75) Inventors: Michael Leslie Clyde Papple, Verdun (CA); Russell J. Bergman, Windsor, CT (US); Mohammed Ennacer, St-Hubert (CA); Shawn J. Gregg, Wethersfield, CT (US); Dominic J. Mongillo, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 571 days.

(21) Appl. No.: 13/586,110

(22) Filed: Aug. 15, 2012

(65) Prior Publication Data
US 2014/0047843 A1 Feb. 20, 2014

(51) Int. Cl.
*F01D 9/02* (2006.01)
*F01D 5/18* (2006.01)

(52) U.S. Cl.
CPC ............... *F01D 9/023* (2013.01); *F01D 5/187* (2013.01); *F05D 2240/81* (2013.01); *F05D 2250/185* (2013.01); *F05D 2260/201* (2013.01); *F05D 2260/22141* (2013.01); *Y02T 50/676* (2013.01)

(58) Field of Classification Search
CPC ........... F01D 5/187; F01D 9/023; F01D 9/06; F01D 9/065; F05D 2240/81; F05D 2250/185; F05D 2260/201; F05D 2260/202; F05D 2260/22141; Y02T 50/676
See application file for complete search history.

(56) References Cited

U.S. PATENT DOCUMENTS

| | | | |
|---|---|---|---|
| 4,353,679 A * | 10/1982 | Hauser | 415/115 |
| 4,749,333 A | 6/1988 | Bonner et al. | |
| 5,145,315 A | 9/1992 | North et al. | |
| 5,634,766 A * | 6/1997 | Cunha et al. | 415/115 |
| 5,746,573 A | 5/1998 | Junkin et al. | |
| 6,241,467 B1 | 6/2001 | Zelesky et al. | |
| 6,254,333 B1 | 7/2001 | Merry | |
| 6,386,825 B1 | 5/2002 | Burdgick | |
| 6,506,013 B1 | 1/2003 | Burdgick et al. | |
| 6,508,620 B2 | 1/2003 | Sreekanth et al. | |
| 6,517,312 B1 | 2/2003 | Jones et al. | |
| 6,899,518 B2 | 5/2005 | Lucas et al. | |
| 6,984,101 B2 | 1/2006 | Schiavo, Jr. | |
| 8,016,546 B2 | 9/2011 | Surace et al. | |
| 8,038,399 B1 | 10/2011 | Liang | |
| 8,096,772 B2 | 1/2012 | Liang et al. | |
| 2008/0190114 A1 | 8/2008 | Surace et al. | |

(Continued)

FOREIGN PATENT DOCUMENTS

WO 2011157549 12/2011

OTHER PUBLICATIONS

International Search Report and Written Opinion for PCT Application No. PCT/US2013/054613 mailed Oct. 24, 2013.

(Continued)

*Primary Examiner* — Richard Edgar
*Assistant Examiner* — Juan G Flores
(74) *Attorney, Agent, or Firm* — Carlson, Gaskey & Olds

(57) ABSTRACT

A component for a gas turbine engine according to an exemplary aspect of the present disclosure includes, among other things, a platform having a first path side and a second path side and a platform cooling circuit disposed on one of the first path side and the second path side of the platform. The platform cooling circuit includes a first core cavity, a cavity in fluid communication with the first core cavity, and a cover plate positioned to cover at least the cavity.

8 Claims, 3 Drawing Sheets

(56) References Cited

U.S. PATENT DOCUMENTS

2009/0028692 A1* 1/2009 Surace et al. ............... 415/115
2010/0239432 A1* 9/2010 Liang .......................... 416/97 R
2011/0044795 A1    2/2011 Chon et al.
2013/0251508 A1* 9/2013 Tardif et al. ............... 415/115

OTHER PUBLICATIONS

International Preliminary Report on Patentability for PCT Application No. PCT/US2013/054613, mailed Feb. 26, 2015.

* cited by examiner

PLATFORM COOLING CIRCUIT FOR A GAS TURBINE ENGINE COMPONENT

BACKGROUND

This disclosure relates generally to a gas turbine engine, and more particularly to a component that can be incorporated into a gas turbine engine. The component can include a platform cooling circuit for cooling a platform of the component.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections of the gas turbine engine may include alternating rows of rotating blades and stationary vanes that extend into the core flow path of the gas turbine engine. For example, in the turbine section, turbine blades rotate to extract energy from the hot combustion gases that are communicated along the core flow path of the gas turbine engine. The turbine vanes prepare the airflow for the next set of blades. These blades and vanes are examples of components that may need cooled by a dedicated source of cooling airflow in order to withstand the relatively high temperatures of the hot combustion gases that are communicated along the core flow path.

SUMMARY

A component for a gas turbine engine according to an exemplary aspect of the present disclosure includes, among other things, a platform having a first path side and a second path side and a platform cooling circuit disposed on one of the first path side and the second path side of the platform. The platform cooling circuit includes a first core cavity, a cavity in fluid communication with the first core cavity, and a cover plate positioned to cover at least the cavity.

In a further non-limiting embodiment of the foregoing component, the first path side is a non-gas path side and the second path side is a gas path side.

In a further non-limiting embodiment of either of the forgoing components, the component is a turbine vane.

In a further non-limiting embodiment of any of the foregoing components, the cavity is a serpentine cavity.

In a further non-limiting embodiment of any of the foregoing components, the platform cooling circuit includes an impingement cavity that is separate from the cavity.

In a further non-limiting embodiment of any of the foregoing components, the cover plate is positioned to cover the impingement cavity.

In a further non-limiting embodiment of any of the foregoing components, the cavity includes a first serpentine portion in fluid communication with the first core cavity and a second serpentine portion in fluid communication with a second core cavity.

In a further non-limiting embodiment of any of the foregoing components, a communication passage connects the first serpentine portion to the second serpentine portion.

In a further non-limiting embodiment of any of the foregoing components, the cavity includes a plurality of augmentation features.

In a further non-limiting embodiment of any of the foregoing components, there are a plurality of openings through the cover plate.

In a further non-limiting embodiment of any of the foregoing components, a second core cavity is in fluid communication with the cavity. The second core cavity is positioned adjacent to the first core cavity on the platform.

A gas turbine engine according to an exemplary aspect of the present disclosure includes, among other things, a compressor section and a combustor section in fluid communication with the compressor section. A turbine section is in fluid communication with the combustor section. One of the compressor section and the turbine section includes at least one component having a platform that includes a platform cooling circuit. The platform cooling circuit includes a first core cavity, a cavity in fluid communication with the first core cavity and a cover plate positioned to cover at least the cavity.

In a further non-limiting embodiment of the foregoing gas turbine engine, the at least one component is a vane.

In a further non-limiting embodiment of either of the foregoing gas turbine engines, the cavity is a serpentine cavity.

In a further non-limiting embodiment of any of the foregoing gas turbine engines, a second core cavity is in fluid communication with the cavity and positioned adjacent to the first core cavity on the platform.

In a further non-limiting embodiment of any of the foregoing gas turbine engines, the platform cooling circuit includes an impingement cavity that is separate from the cavity.

A method of cooling a component of a gas turbine engine according to another exemplary aspect of the present disclosure includes, among other things, communicating a cooling airflow into a first core cavity of a platform of the component and circulating the cooling airflow from the first core cavity through a first portion of a cavity that is in fluid communication with the first core cavity.

In a further non-limiting embodiment of the foregoing method of cooling a component of a gas turbine engine, the cooling airflow can be communicated into a second core cavity of the platform and circulated from the second core cavity through a second portion of the cavity that is in fluid communication with the second core cavity.

In a further non-limiting embodiment of either of the foregoing methods of cooling a component of a gas turbine engine, the cavity is a serpentine cavity.

In a further non-limiting embodiment of any of the foregoing methods of cooling a component of a gas turbine engine, the step of communicating includes communicating the cooling airflow through at least one feed opening in a leading edge portion of the platform and into the first core cavity.

The various features and advantages of this disclosure will become apparent to those skilled in the art from the following detailed description. The drawings that accompany the detailed description can be briefly described as follows.

DETAILED DESCRIPTION

Figure 1:
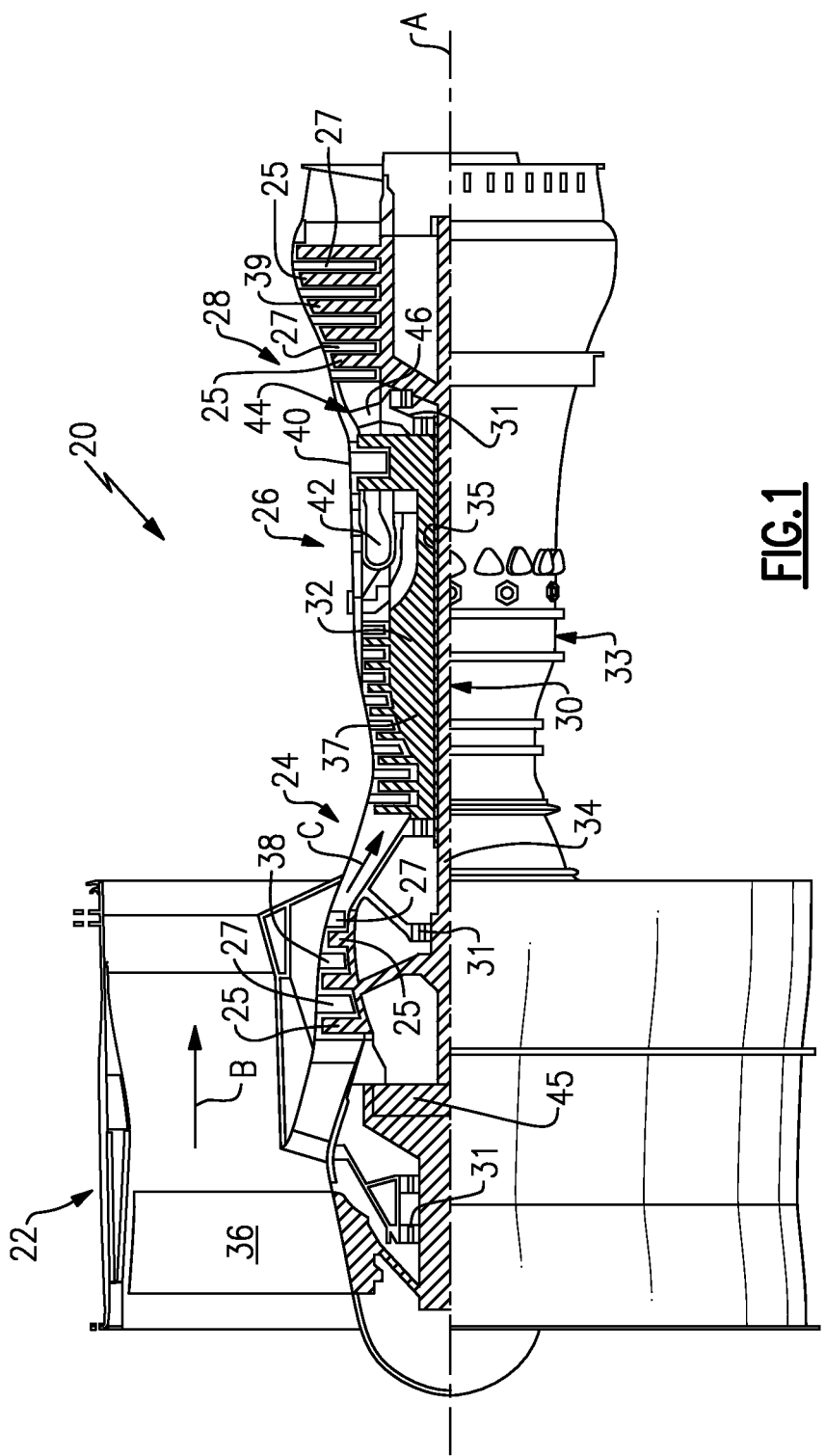
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In a non-limiting embodiment, the gas turbine engine 20 is a high-bypass geared aircraft engine. In a further example, the gas turbine engine 20 bypass ratio is greater than about six (6:1). The geared architecture 45 can include an epicyclic gear train, such as a planetary gear system or other gear system. The example epicyclic gear train has a gear reduction ratio of greater than about 2.3, and in another example is greater than about 2.5:1. The geared turbofan enables operation of the low speed spool 30 at higher speeds, which can increase the operational efficiency of the low pressure compressor 38 and low pressure turbine 39 and render increased pressure in a fewer number of stages.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about 5 (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of "T"/$518.7^{0.5}$, where T represents the ambient temperature in degrees Rankine. The Low Corrected Fan Tip Speed according to one non-limiting embodiment of the example gas turbine engine 20 is less than about 1150 fps (351 m/s). The teachings of this disclosure could also extend to non-geared, low-bypass, no-bypass and industrial applications.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, such as the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require cooling circuits for cooling the parts during engine operation. Example platform cooling circuits for cooling a platform of a component are discussed below.

Figure 2:
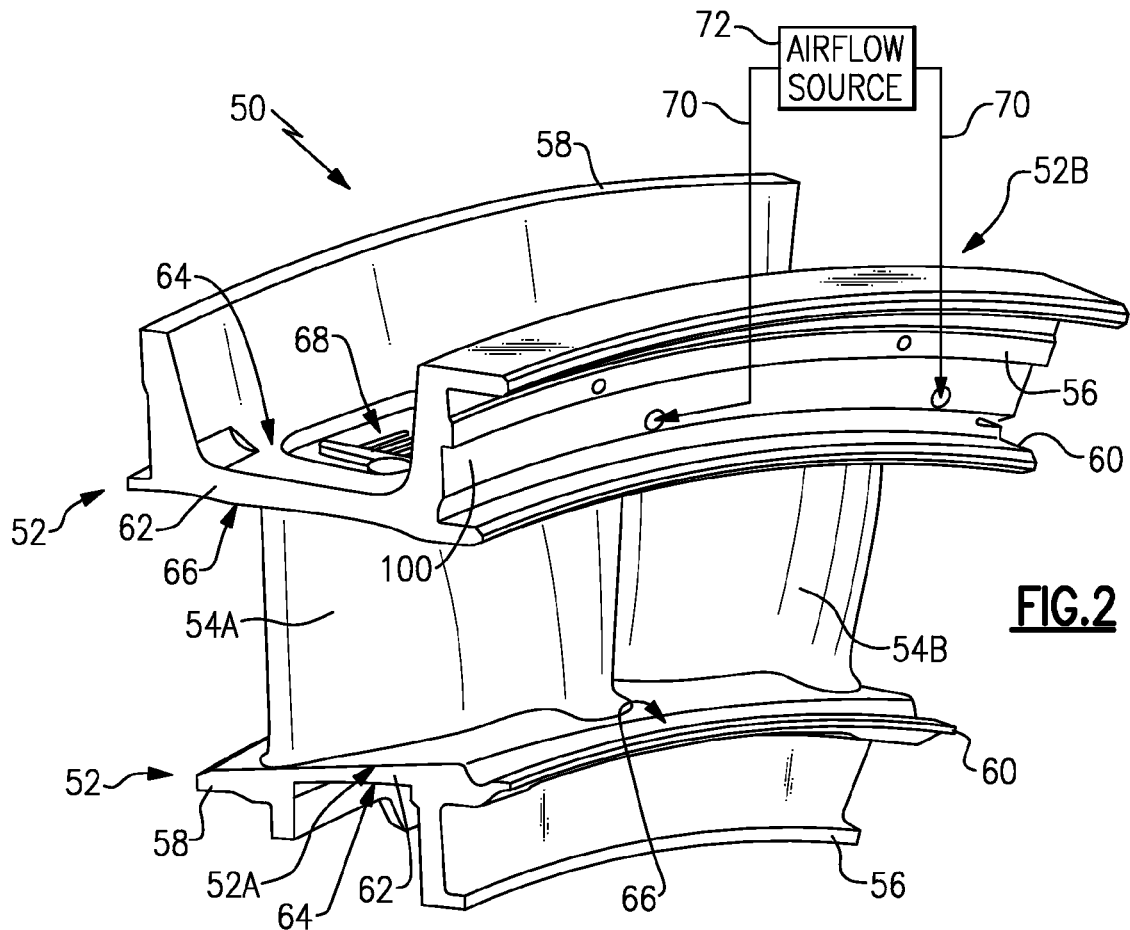
FIG. 2 illustrates a component that can be incorporated into a gas turbine engine.

FIG. 2 illustrates a component 50 that can be incorporated into a gas turbine engine, such as the gas turbine engine 20 of FIG. 1. In this embodiment, the component 50 is a turbine vane. However, the teachings of this disclosure are not limited to turbine vanes and could extend to other components of the gas turbine engine 20, including but not limited to, compressor blades and vanes, turbine blades, blade outer air seals (BOAS), mid-turbine frames, transition ducts, or any other component that extends within the core flow path C.

The component 50 can include one or more platforms 52 and one or more airfoils 54 that extend from the platform(s) 52. In this particular embodiment, the component 50 includes an inner diameter platform 52A and an outer diameter platform 52B as well as two airfoils 54A, 54B that extend between the inner and outer platforms 52A, 52B. Although illustrated as a vane doublet, it should be understood that vane singlets or other vane assemblies may benefit from the teachings of this disclosure, and that non-airfoil components, such as BOAS or transition ducts, may also benefit from these teachings.

The platform(s) 52 include a leading edge portion 56, a trailing edge portion 58, and opposing mate faces 60, 62. The platform(s) 52 axially extend between the leading edge portion 56 and the trailing edge portion 58 and circumferentially extend between the opposing mate faces 60, 62. The opposing mate faces 60, 62 can be mounted relative to corresponding mate faces of adjacent components of a gas turbine engine to provide a full ring assembly, such as a full ring vane assembly that can be circumferentially disposed about the engine centerline longitudinal axis A (see FIG. 1).

The platforms can also include a first path side (for example, a non-gas path side) 64 and a second path side (for example a gas path side) 66. In other words, when the component 50 is mounted within the gas turbine engine 20, the non-gas path side 64 is positioned on a non-core flow path side of the component 50, while the gas path side 66 may establish an outer boundary of the core flow path C of the gas turbine engine 20.

One or both of the platforms 52 can also include a platform cooling circuit 68 for cooling the platform 52. A cooling airflow 70 can be circulated through the platform cooling circuit 68 to transfer thermal energy from the platform 52 to the cooling airflow 70, thereby cooling portions of the platform 52. The cooling airflow 70 is communicated to the platform cooling circuit 68 from an airflow source 72 that is external to the component 50. The cooling airflow 70 is of a lower temperature than the airflow communicated along the core flow path C that is communicated across the component 50. In one embodiment, the cooling airflow 70 is a bleed airflow that can be sourced from the compressor section 24 or any other portion of the gas turbine engine that is upstream from the component 50. The cooling airflow 70 could also be a recycled cooling airflow that is first used to cool an upstream component of the gas turbine engine 20, such as an upstream BOAS, for example.

Figure 3:
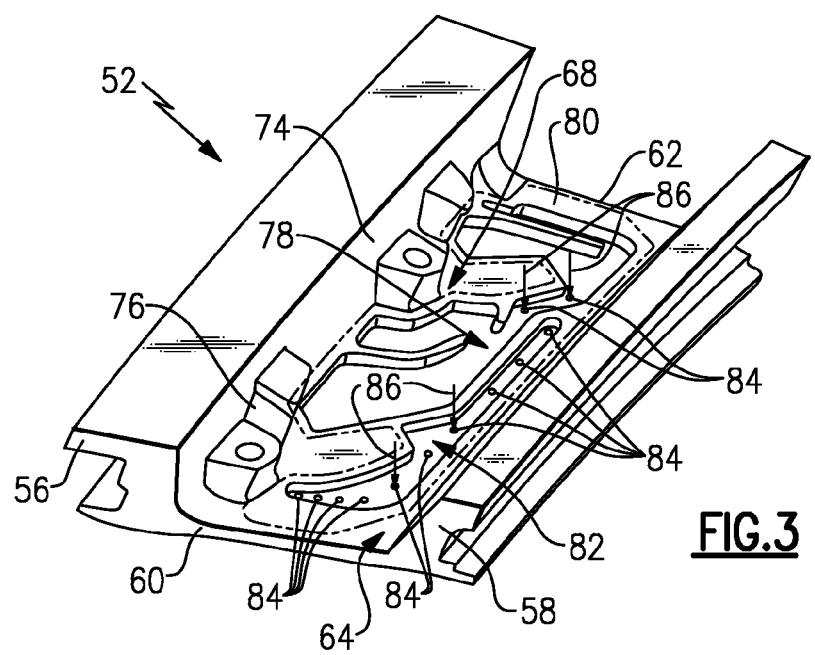
FIG. 3 illustrates a platform of a component that can be incorporated into a gas turbine engine.

One exemplary platform cooling circuit 68 is illustrated by FIG. 3. The platform cooling circuit 68 is disposed on the non-gas path side 64 of the platform 52. In this embodiment, the platform 52 could be representative of either an inner diameter platform or an outer diameter platform of a vane, or could be a platform of some other component, including but not limited to, a blade or a BOAS.

The exemplary platform cooling circuit 68 can include a first core cavity 74, a second core cavity 76 that is adjacent to the first core cavity 74, a serpentine cavity 78 (i.e., a third cavity) that is in fluid communication with each of the first core cavity 74 and the second core cavity 76, and a cover plate 80 positioned at the non-gas path side 64 of the platform 52. It should be understood that the platform cooling circuit 68 could include fewer or additional core cavities and is not necessarily limited to the particular configuration shown in FIG. 3.

The first core cavity 74 and the second core cavity 76 can receive cooling airflow 70 from the airflow source 72 to provide convective cooling to the leading edge portion 56 of the platform 52 and the serpentine cavity 78. In one non-limiting embodiment, the first core cavity 74 and the second core cavity 76 are produced using a ceramic core and the serpentine cavity 78 is produced using a wax form or a ceramic core.

In this embodiment, the cover plate 80 is positioned to cover the serpentine cavity 78 to define an enclosed cooling passage therein. The cover plate 80 may be brazed or welded onto the non-gas path side 64 of the platform 52. The cover plate 80 may be shaped similar to the serpentine cavity 78.

The platform cooling circuit 68 can further include an impingement cavity 82 that is separate from the serpentine cavity 78. The impingement cavity 82 is positioned adjacent to the trailing edge portion 58 of the platform 52 and may extend from a position adjacent to the mate face 60 toward the opposing mate face 62. The impingement cavity 82 of this embodiment is generally L-shaped, although other shapes are also contemplated. The cover plate 80 may extend to also cover the impingement cavity 82.

In a non-limiting embodiment, the cover plate 80 may include one or more openings 84 that extend through the cover plate 80. Impingement cooling airflow 86 can be communicated through the openings 84 into portions of one or both of the serpentine cavity 78 and the impingement cavity 82 to impingement cool the surfaces of these cavities. The impingement cooling airflow 86 can be sourced from the airflow source 72 or from a separate source.

Figure 4:
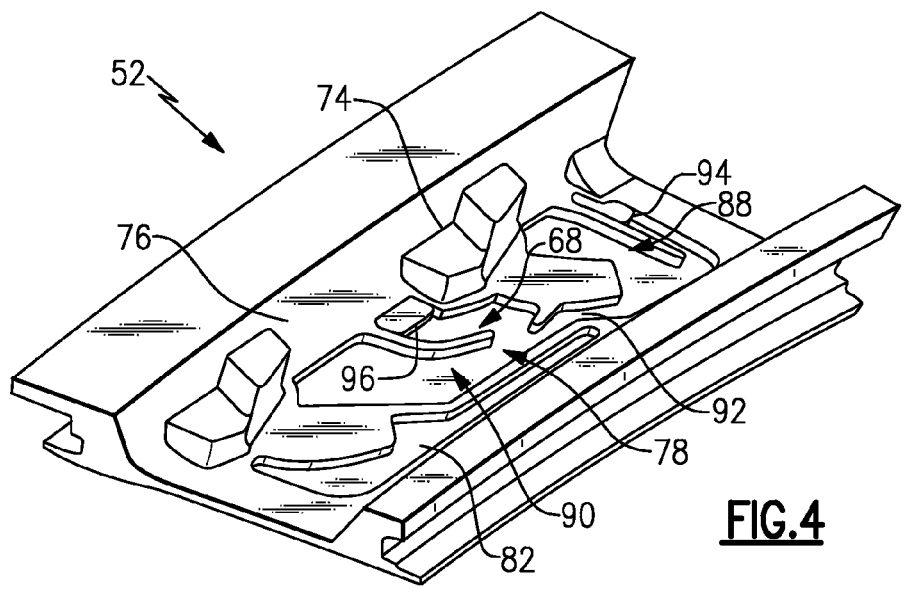
FIG. 4 illustrates an exemplary platform cooling circuit of a platform of a component.

FIG. 4 illustrates the platform 52 with the cover plate 80 removed to better illustrate several features of the platform cooling circuit 68. In this embodiment, the serpentine cavity 78 includes a first serpentine portion 88 and a second serpentine portion 90. A communication passage 92 can connect the first serpentine portion 88 to the second serpentine portion 90. In one embodiment, a portion of the openings 84 of the cover plate 80 are positioned to direct the impingement cooling airflow 86 into the communication passage 92 (see FIG. 3). The communication passage 92 can be a cast or machined feature of the platform cooling circuit 68.

The first serpentine portion 88 of the serpentine cavity 78 is in fluid communication with the first core cavity 74, and the second serpentine portion 90 is in fluid communication with the second core cavity 76. The first core cavity 74 may feed into an inlet 94 of the first serpentine portion 88, and the second core cavity 76 may feed into an inlet 96 of the second serpentine portion 90.

Figure 5:
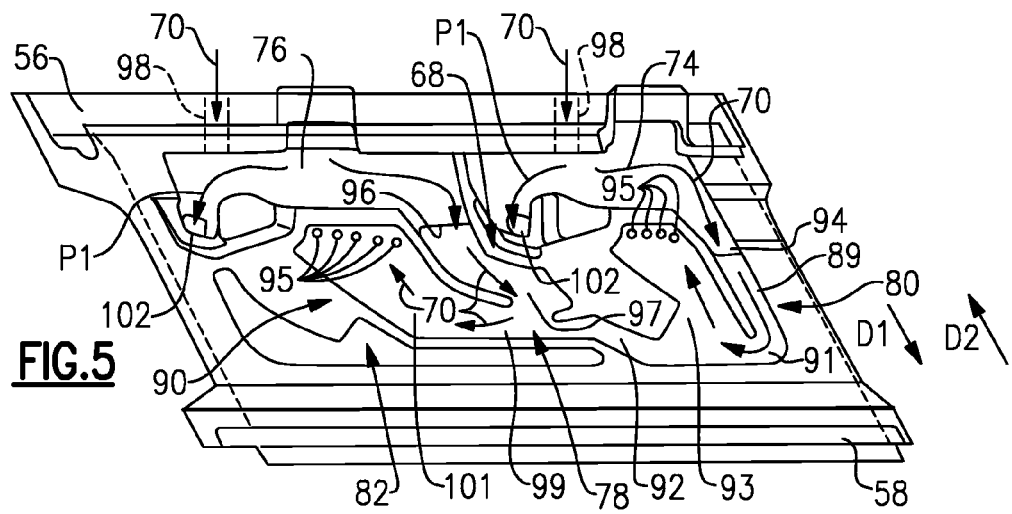
FIG. 5 illustrates another exemplary platform cooling circuit.

FIG. 5 schematically illustrates a method of cooling the component 50 using the exemplary platform cooling circuit 68. Cooling airflow 70 can be communicated into each of the first core cavity 74 and the second core cavity 76. The cooling airflow 70 is communicated through one or more feed openings 98 that can extend through the leading edge portion 56 of the platform 52. In one embodiment, the feed openings 98 extend through an upstream wall 100 of the leading edge portion 56 (see FIG. 2). However, the feed openings 98 can be positioned at any location of the platform 52 to direct the cooling airflow 70 into the first core cavity 74 and the second core cavity 76.

The cooling airflow 70 that is communicated into the first core cavity 74 can be directed to the inlet 94 of the first serpentine portion 88 of the serpentine cavity 78. The cooling airflow 70 can then be communicated in a serpentine path that is established by the serpentine cavity 78 to cool the platform 52. For example, the cooling airflow 70 can first be directed from the inlet 94 in a first direction D1 toward the trailing edge portion 58 within a first passage 89 of the first serpentine portion 88. The cooling airflow 70 is then communicated through a turn 91 of the first serpentine portion 88 prior to entering a second passage 93. The cooling airflow 70 is communicated within the second passage 93 in a second direction D2 that is opposite of the first direction D1. The cooling airflow 70 can exit the first serpentine portion 88 through film openings 95 disposed within the second passage 93. For example, the cooling airflow 70 can be returned to the core flow path C.

Meanwhile, the cooling airflow 70 from the second core cavity 76 can be communicated through the inlet 96 of the second serpentine portion 90 of the serpentine cavity 78 and into a first passage 97. The cooling airflow 70 is directed in the first direction D1 within the first passage 97 before entering a turn 99. From the turn 99, the cooling airflow 70 can be communicated in the second direction D2 within a second passage 101. In other words, the cooling airflow 70 is circulated through the second serpentine portion 90 to cool the platform 52. The cooling airflow 70 can exit the second serpentine portion 90 through film openings 95 disposed within the second passage 101.

Portions of the cooling airflows 70 of both the first serpentine portion 88 and the second serpentine portion 90 may be intermixed within the communication passage 92. In this embodiment, the communication passage 92 extends between the second passage 93 of the first serpentine portion 88 and the first passage 97 of the second serpentine portion 90.

The platform cooling circuit 68 can also impingement cool portions of the platform 52, such as described above via the openings 84 of the cover plate 80 (see FIG. 3). Portions P1 of the cooling airflow 70 may also be communicated into a cavity 102 of the component 50 to cool other portions of the component 50, such as an airfoil portion. The portions P1 of the cooling airflow 70 can enter the cavity 102 through one or both of the first core cavity 74 and the second core cavity 76.

Figure 6:
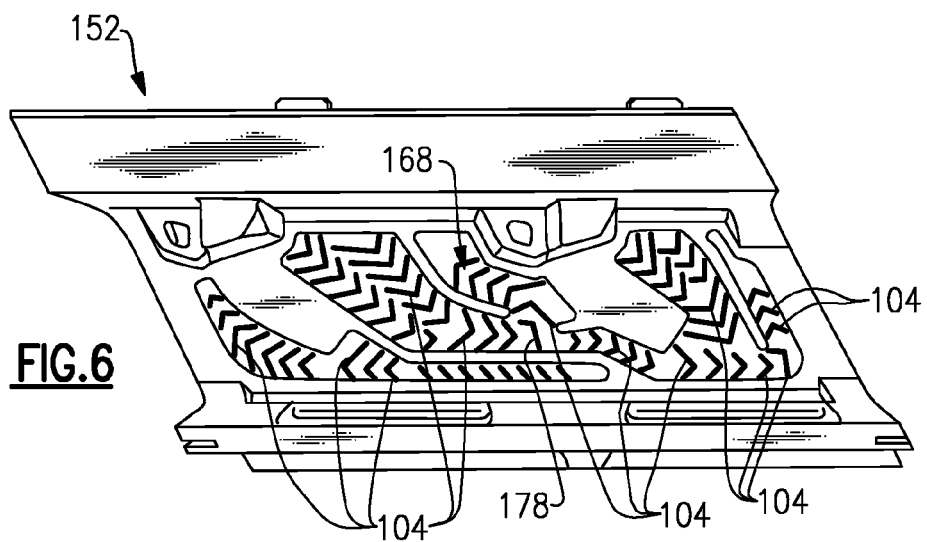
FIG. 6 illustrates yet another exemplary platform cooling circuit.

FIG. 6 illustrates another exemplary platform cooling circuit 168 of a platform 152 of a component 150. The platform cooling circuit 168 is similar to the platform cooling circuit 68 described above but may include slightly modified features. In this disclosure, like reference numerals signify like or similar features, whereas reference numerals modified by "100" signify features that have been modified.

In this embodiment, the platform cooling circuit 168 includes a serpentine cavity 178 having a plurality of augmentation features 104. The plurality of augmentation features 104 may include any heat transfer augmentation feature such as pins, linear trip strips, or chevron trip strips. In another embodiment, the impingement cavity 82 also includes augmentation features 104.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. A gas turbine engine, comprising:
    a compressor section;
    a combustor section in fluid communication with said compressor section;
    a turbine section in fluid communication with said combustor section; and
    wherein one of said compressor section and said turbine section includes at least one component having a platform that includes a platform cooling circuit, wherein said platform cooling circuit includes:
        a first core cavity;
        a second core cavity adjacent to said first core cavity;
        a cavity in fluid communication with said first core cavity and said second core cavity; and
        said first core cavity configured to communicate a cooling airflow into a first inlet of a first portion of said cavity and said second core cavity configured to feed said cooling airflow into a second inlet of a second portion of said cavity.

2. The gas turbine engine as recited in claim 1, wherein said at least one component is a vane.

3. The gas turbine engine as recited in claim 1, wherein said cavity is a serpentine cavity.

4. The gas turbine engine as recited in claim 1, wherein said platform cooling circuit includes an impingement cavity that is separate from said cavity.

5. A method of cooling a component of a gas turbine engine, comprising the steps of:
    communicating a cooling airflow into a first core cavity and a second core cavity of a platform of the component;
    circulating a first portion of the cooling airflow from the first core cavity through a first portion of a cavity that is in fluid communication with the first core cavity; and
    circulating a second portion of the cooling airflow from the second core cavity through a second portion of the cavity that is in fluid communication with the second core cavity.

6. The method as recited in claim 5, wherein the cavity is a serpentine cavity.

7. The method as recited in claim 5, wherein the step of communicating includes communicating the cooling airflow through at least one feed opening in a leading edge portion of the platform and into the first core cavity.

8. A component for a gas turbine engine, comprising:
    a platform; and
    a platform cooling circuit disposed on a non-gas path side of said platform, wherein said platform cooling circuit includes:
        a first core cavity;
        a second core cavity adjacent to said first core cavity;
        a cavity in fluid communication with said first core cavity and said second core cavity, said first core cavity configured to communicate a cooling airflow into a first inlet of a first portion of said cavity and said second core cavity is configured to feed said cooling airflow into a second inlet of a second portion of said cavity; and
        a cover plate positioned to cover said cavity while leaving portions of said first core cavity and said second core cavity uncovered.

* * * * *